United States Patent [19]

Bryant

[11] Patent Number: 4,934,752
[45] Date of Patent: Jun. 19, 1990

[54] EMERGENCY VEHICLE BODY

[75] Inventor: Geoffrey A. Bryant, Livonia, Mich.

[73] Assignee: Ford Motor Company, Dearborn, Mich.

[21] Appl. No.: 325,182

[22] Filed: Mar. 17, 1989

[51] Int. Cl.⁵ ............................................. B60R 27/00
[52] U.S. Cl. ................................... 296/210; 296/218; 40/592
[58] Field of Search ...................... 296/210, 218, 1 R; 40/592; 340/120, 81 R

[56] References Cited

U.S. PATENT DOCUMENTS

| | | | |
|---|---|---|---|
| 2,252,161 | 8/1941 | Borba | 350/622 |
| 2,883,665 | 4/1959 | Maratzke et al. | 343/878 |
| 3,076,936 | 2/1963 | Housman | 455/345 |
| 3,205,351 | 9/1965 | Walker | 362/74 |
| 4,101,159 | 7/1978 | Stewart | 296/37.7 |
| 4,210,360 | 7/1980 | Powers | 296/216 |
| 4,241,870 | 12/1980 | Marcus | 296/37.7 |
| 4,684,164 | 8/1987 | Durham | 296/27.7 |
| 4,707,014 | 11/1987 | Rich | 296/15 |

Primary Examiner—Robert R. Song
Attorney, Agent, or Firm—Daniel M. Stock; Roger L. May

[57] ABSTRACT

An emergency vehicle body is provided by piercing the roof of a general purpose passenger vehicle with an aperture of the type employed to receive a conventional sun roof and selectively providing a warning equipment module or a closure panel removably sealingly engaged in the roof aperture. The warning equipment module has upper and lower subassemblies connected through the aperture, providing an electrical conduit path spaced from the seal between the subassemblies.

13 Claims, 2 Drawing Sheets

4,934,752

EMERGENCY VEHICLE BODY

BACKGROUND OF THE INVENTION

The present invention relates generally to automotive vehicle bodies, and more specifically to such bodies having roofs configured to mount warning equipment thereon.

It is well known in the automotive vehicle assembly arts to modify a passenger car or truck for use as an emergency vehicle through the addition of special purpose equipment to the basic vehicle to make it suitable for its end use. It is desirable that much of this special purpose equipment be readily removable from the vehicle by its owner to facilitate its resale as a general purpose vehicle after some period of emergency vehicle use. One class of special purpose equipment presents difficulty in this regard, however; that is the electrically operated warning equipment, such as flashing lights, spotlights, sirens and speakers, generally mounted on the roof of such vehicles. Such equipment is typically mounted on a base which extends laterally across the roof of the vehicle and which is mounted to the roof in a secure manner either through clamps or threaded fasteners which pierce sheet metal from which the roof is formed. Either type of fastening, and particularly the threaded fastener type, create discontinuities in the vehicle's roof surface which adversely affect the resale value of the vehicle for general purpose use. In addition, the routing of wiring to deliver electrical power from the vehicle to the warning equipment also results in the piercing of body panels to route the wires, giving the same adverse effect on the appearance of the roof or adjacent body panels.

SUMMARY OF THE INVENTION

Responsive to the deficiencies in the prior art, it is an object of the present invention to provide an emergency vehicle body configured to provide for the mounting of warning equipment on the roof of the body without damage to the body panels forming the roof upper surface.

It is a further object of the present invention to provide such an emergency vehicle body in which electrical power is transmitted to the warning equipment without adversely affecting the roof upper surface.

According to one feature of the present invention, an emergency vehicle body is provided with a roof aperture of the type conventionally employed for mounting sun roofs and a warning equipment module is removably sealingly secured within the aperture.

According to another feature of the present invention, an electrical conduit path is formed in the vehicle body extending from a body mounted electrical power source to the warning equipment module wholly within the confines of the outer panel of the roof.

BRIEF DESCRIPTION OF THE DRAWINGS

These and other objects and features will become apparent to those skilled in the automotive assembly arts upon reading the following description with reference to the accompanying drawings in which.

DESCRIPTION OF THE PREFERRED EMBODIMENT

Figure 1:
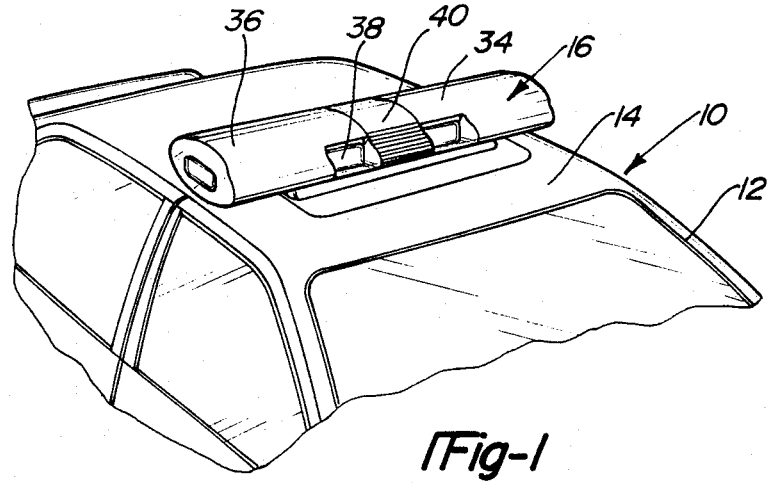
FIG. 1 is a perspective view of an emergency vehicle body according to the present invention illustrating a warning equipment module extending above the vehicle roof.
Figure 2:
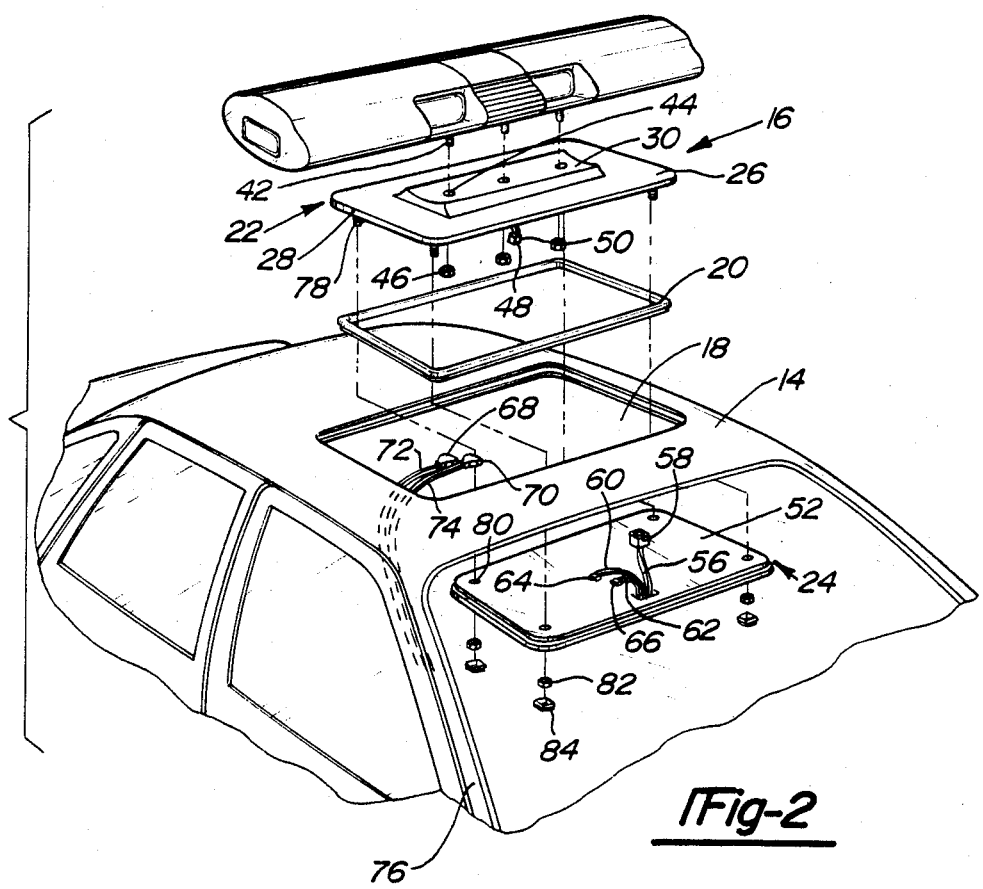
FIG. 2 is a simplified perspective exploded view of an emergency vehicle body according to the present invention illustrating the assembly of the warning equipment module into a roof aperture of the vehicle body.

An emergency vehicle indicated generally at 10 includes a vehicle body 12 having a roof 14 upon which is mounted a warning equipment module 16. As may best be seen in FIG. 2, the roof 14 is pierced by a vertically extending generally rectangular aperture 18 which may be of the type customarily utilized in providing a window through the roof, or sun roof, for a general purpose automotive passenger vehicle. The warning equipment module 16 is fixed to the vehicle 10 closing the aperture 18 and a flexible seal member 20 is sealingly engaged between the warning equipment module 16 and portions of the roof 14 bounding the aperture 18. The warning equipment module 16 is illustrated as comprising generally an exterior subassembly 22 and an interior subassembly 24.

The exterior subassembly is illustrated as comprising a generally rectangular base member 26 having outer peripheral surfaces 28 for engaging the seal member 20 and a central pedestal 30 having a curved top support surface 32 for supportively receiving a generally elliptically shaped, laterally extending light bar 34. The design of the light bar 34 itself may be of any suitable configuration for carrying electrically operated warning devices such as flashing lights 36, speakers 38 or a spotlight 40. In the preferred embodiment shown, however, the light bar 34 provides for carrying a plurality of depending threaded fasteners 42 arranged to be inserted through clearance holes 44 in the base 26 to engage nuts 46 to mechanically connect the components of the exterior subassembly 22. Also depending from the light bar 34 through the base 26 is a portion of a wiring harness 48 terminating in a connector 50.

Figure 3:
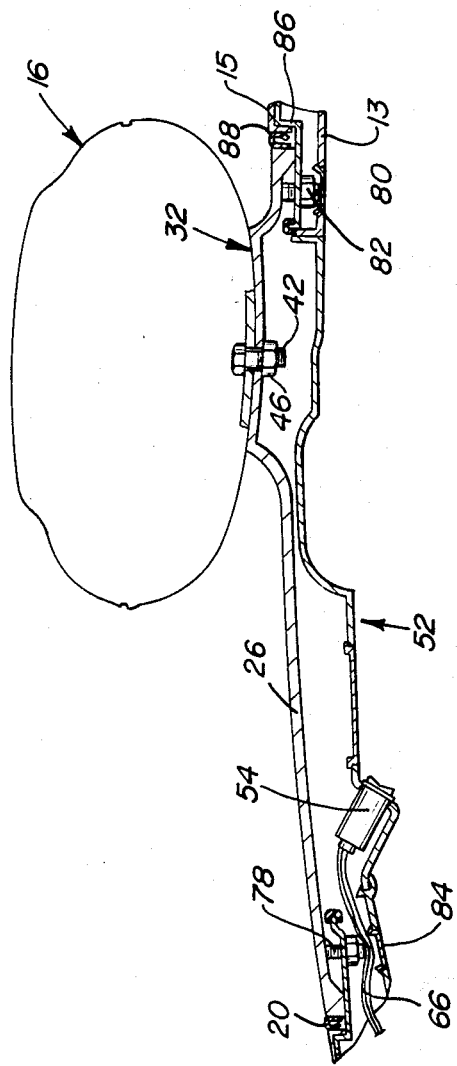
FIG. 3 is a longitudinally extending cross-sectional view of the roof of the emergency vehicle body of the present invention.

The lower subassembly 24 includes a generally rectangular housing 52 which preferably will include switches such as that shown diagrammatically in FIG. 3 at 54 and other control devices for controlling the operation of the electrically operated warning devices in the light bar 34. A wiring harness 56 extends upwardly from the housing 52 and terminates in a connector 58 arranged to effect connection with the connector 50 of the upper subassembly 22. Another pair of wiring harnesses 60, 62 terminating in connectors 64, 66, respectively, extend out of the housing 50 to mate with connectors 68, 70 of vehicle wiring harnesses 72, 74, respectively.

The wiring harnesses 72, 74 are illustrated as being arranged along a conduit path defined through a support pillar 76 of the roof 14. They are electrically connected in a known manner to the electrical power system (not shown) of the vehicle 10.

In the preferred embodiment illustrated, depending studs 78 of the base 26 of the exterior subassembly 22 are inserted through clearance holes 80 in the rectangular housing 52 and nuts 82 are threadedly engaged on the studs 78 to secure the upper subassembly 22 to the roof 14 as may best be seen in FIG. 3. Cover members 84 are inserted in the clearance holes 80 after tightening the nuts 82.

Turning now to FIG. 3, the assembled position of the warning equipment module 16 within the aperture 18 and the cooperation of the structure of the module 16 with portions of the vehicle roof 14 can be readily appreciated. The FIG. 3 configuration represents a preferred way of effecting the assembly shown in simplified form in FIG. 2. In this preferred embodiment, the top of the housing 52 is open and the clearance holes ar formed through the lower surfaces. In general, the roof 14 comprises an inner panel 13 and an outer panel 15 fixedly secured together as by welding to form a boxlike structure. In the preferred embodiment shown, a support plate 86 extends inwardly with respect to the aperture 18 and includes apertures for receiving the studs 78 and is fixedly secured to the outer panel 15 by the nuts 82 to effectively form a part of the roof 14 for supporting the exterior module 22. The exterior module is thus well supported for carrying loads imposed at its point of connection by its substantial weight and the dynamic loads such as wind and impact and vibratory forces encountered during vehicle operation. The seal 20 may be fixedly secured as by adhesives to the outer peripheral surfaces 28 of the base 26 to sealingly engage the upstanding wall 88 formed at the point of connection of the outer roof panel 15 with the reinforcing plate 86. It will be understood that the housing 52 of the interior subassembly 24, which is illustrated as a multi-piece plastic structure may be formed as a unitary structure and, in any event, is to be secured below the surface of the inner surface of the roof 14 by conventional means to interior trim components (not shown). It should also be understood that the upper surface of the housing 52 may be configured to define the flat planar shape shown in the simplified exploded view of FIG. 2.

While only one embodiment of the present invention has been described, others may be possible without departing from the scope of the following claims.

I claim:

1. An emergency vehicle body comprising:
   a roof;
   a source of electrical power mounted in the body remotely from the roof;
   an aperture extending vertically through the roof; and
   a warning equipment module removably sealingly engaged within the aperture and electrically connected to the power source.

2. An emergency vehicle body as defined in claim 1 wherein the warning equipment module comprises:
   an exterior subassembly projecting from the aperture above the roof and including electrically operated warning devices; and
   an interior subassembly positioned below the roof in registration with the aperture and having means for controlling the operation of the warning devices carried in the exterior subassembly.

3. An emergency vehicle body as defined in claim 1 and further comprising a roof closure panel removably sealingly engageable with the aperture upon removal of the warning equipment module.

4. An emergency vehicle body as defined in claim 2 wherein the exterior subassembly is fixedly secured to the roof.

5. A warning equipment module as defined in claim 4 wherein the interior subassembly is fixedly secured to the exterior subassembly.

6. An emergency vehicle body as defined in claim 2 wherein a plurality of support pillars are interposed between the roof and the remainder of the body and an electrical conduit path is formed whereby wiring connections are effected between the power source and the warning equipment module through the pillars.

7. An emergency vehicle body as defined in claim 6 wherein the wiring connections extend between the exterior subassembly and the interior subassembly of the warning equipment module.

8. An emergency vehicle body comprising:
   a roof;
   a plurality of support pillars interposed between the roof and the remainder of the body;
   a source of electrical power mounted in the body remotely from the roof;
   an aperture extending vertically through the roof;
   a warning equipment module having means for effecting removable sealing engagement within the aperture and electrically connected to the power source; and
   means defining an electrical conduit path within the pillars and extending between the exterior subassembly and the interior subassembly and spaced from the seal means and the upper surface of the roof to effect electrical connections between the power source and the warning devices.

9. A warning equipment module adapted to be mounted on an automotive vehicle body to extend upwardly above the roof thereof through an aperture formed through the roof, the module comprising:
   an exterior subassembly adapted to project from the aperture above the roof, having a base portion received in the aperture, the base portion carrying warning devices;
   an interior subassembly positioned below the roof in registration with the aperture and having means for controlling the operation of the warning devices carried in the exterior subassembly; and
   seal means carried with the base portion for effecting removable sealing engagement of the module with respect to the roof.

10. A warning equipment module as defined in claim 9 wherein the exterior subassembly is adapted to be fixedly secured to the roof.

11. A warning equipment module as defined in claim 9 wherein only the exterior subassembly is adapted to be fixedly secured to the roof.

12. A warning equipment module as defined in claim 10 wherein the interior subassembly is fixedly secured to the exterior subassembly.

13. A warning equipment module as defined in claim 12 wherein certain of the warning devices include wiring extending therefrom and the wiring extends between the exterior subassembly and the interior subassembly.

* * * * *